US012553010B2

(12) United States Patent
Garcia Subirats et al.

(10) Patent No.: US 12,553,010 B2
(45) Date of Patent: Feb. 17, 2026

(54) TOILET CLEANER

(71) Applicant: ZOBELE HOLDING, S.P.A., Trento (IT)

(72) Inventors: Maria Garcia Subirats, Barcelona (ES); Montserrat Riera Giner, Barcelona (ES); Giovanni Carrara, Trento (IT)

(73) Assignee: ZOBELE HOLDING, S.P.A., Trento (IT)

( * ) Notice: Subject to any disclaimer, the term of this patent is extended or adjusted under 35 U.S.C. 154(b) by 542 days.

(21) Appl. No.: 17/418,549

(22) PCT Filed: Dec. 23, 2019

(86) PCT No.: PCT/EP2019/086941

§ 371 (c)(1),
(2) Date: Jun. 25, 2021

(87) PCT Pub. No.: WO2020/136174

PCT Pub. Date: Jul. 2, 2020

(65) Prior Publication Data

US 2022/0064572 A1 Mar. 3, 2022

(30) Foreign Application Priority Data

Dec. 27, 2018 (EP) .................................... 18382997

(51) Int. Cl.

| | |
|---|---|
| ***C11D 3/00*** | (2006.01) |
| ***C11D 3/10*** | (2006.01) |
| ***C11D 3/20*** | (2006.01) |
| ***C11D 3/22*** | (2006.01) |
| ***C11D 3/34*** | (2006.01) |
| ***C11D 3/37*** | (2006.01) |
| ***C11D 3/50*** | (2006.01) |
| ***C11D 17/06*** | (2006.01) |

(52) U.S. Cl.

CPC .......... *C11D 3/0052* (2013.01); *C11D 3/0094* (2013.01); *C11D 3/10* (2013.01); *C11D 3/2086* (2013.01); *C11D 3/225* (2013.01); *C11D 3/3463* (2013.01); *C11D 3/349* (2013.01); *C11D 3/3707* (2013.01); *C11D 3/50* (2013.01); *C11D 17/06* (2013.01); *C11D 2111/14* (2024.01)

(58) Field of Classification Search

CPC ............................ C11D 11/023; C11D 3/0052
See application file for complete search history.

(56) References Cited

U.S. PATENT DOCUMENTS

| | | | | |
|---|---|---|---|---|
| 6,468,950 | B1 | 10/2002 | Kawasaki | |
| 2002/0058605 | A1 * | 5/2002 | Schmidt ............ | C11D 17/0073 510/509 |
| 2005/0250667 | A1 * | 11/2005 | Quellet ................ | C11D 3/0052 510/444 |
| 2007/0000067 | A1 * | 1/2007 | Shi ....................... | C11D 3/0052 8/137 |
| 2018/0105766 | A1 * | 4/2018 | Caparrós Casco .......................... | C11D 17/0073 |
| 2018/0187130 | A1 * | 7/2018 | Barreleiro ............ | C11D 3/3761 |

FOREIGN PATENT DOCUMENTS

| | | | |
|---|---|---|---|
| DE | 19919443 | A1 | 11/2000 |
| DE | 202010008026 | U1 | 1/2011 |
| GB | 2334961 | | 9/1999 |
| GB | 2400108 | | 10/2004 |
| WO | 2006136773 | A1 | 12/2006 |
| WO | 2020136174 | | 7/2020 |

OTHER PUBLICATIONS

International Search Report and Written Opinion for PCT/EP2019/086941, mailed Apr. 6, 2020.

* cited by examiner

*Primary Examiner* — Necholus Ogden, Jr.
(74) *Attorney, Agent, or Firm* — Kutak Rock LLP

(57) ABSTRACT

The present invention relates to a toilet cleaner comprising a cleaning agent, wherein said cleaning agent is included at a percentage between 50% and 80% by weight, and also comprising an effervescent agent at a percentage between 10% and 30% by weight. The cleaner is preferably in the form of solid granules, and it also comprises a foaming agent.

The present invention allows providing a cleaner in solid form which can be applied directly in the toilet bowl and readily metered, giving the user a perception of cleanliness.

6 Claims, No Drawings

TOILET CLEANER

This is the United States National Stage of Patent Cooperation Treaty Application No. PCT/EP2019/086941 filed Dec. 23, 2019, which claims priority to European Patent Application No. 18382997.7, filed on Dec. 27, 2018, the disclosures of which are incorporated herein by reference in their entireties.

The present invention relates to a toilet cleaner which is formed as granules that are placed in the toilet bowl for cleaning same.

BACKGROUND OF THE INVENTION

Cleaners are commonly used today for cleaning toilet bowls, and different types of these cleaners are available.

For example, there are cleaners which only act when flushing the toilet tank with water, and these cleaners are usually placed in a support placed in the toilet bowl or they can even be adhered to the toilet bowl.

Cleaners of these types have a limited effect given that they are only used when flushing the toilet tank with water.

Furthermore, different toilet cleaners in the form of tablets or the like, which are placed in the toilet tank and dispense a cleaning active ingredient for a certain time period, are known. These tablets include different types of cleaning agents, such as surfactants, disinfectants, and mixtures thereof, and are designed for being immersed in water for a long period of time, cleaning the toilet bowl with every flush.

There are also toilet cleaners in the form of gel or liquids which are distributed directly in the toilet bowl, are easy to use and can be automatically pumped. However, these liquid cleaners dissolve almost instantaneously in water, such that a large amount of liquid cleaner is required to achieve the desired cleanliness.

Another problem with liquid cleaners lies in their inability to contain large amounts of organic surfactants as they do not dissolve in water. Furthermore, these cleaners may contain corrosive chemicals which may be hazardous in the event of an accidental spillage.

Finally, there are also powder toilet cleaners which have the drawback of having a high risk of inhalation, with the subsequent problem of damaging the respiratory tracts if inhaled.

Therefore, an objective of the present invention is to provide a cleaner in solid form which can be applied directly in the toilet bowl and readily metered, giving the user a perception of cleanliness.

DESCRIPTION OF THE INVENTION

The mentioned drawbacks are solved with the toilet cleaner of the invention which has other advantages that will be described below.

The toilet cleaner according to the present invention comprises a cleaning agent, wherein said cleaning agent is included at a percentage between 50% and 80% by weight, and wherein it also comprises an effervescent agent at a percentage between 10% and 30% by weight.

Said cleaning agent is, for example, sulfamic acid, and said effervescent agent is selected from the group including sodium bicarbonate, sodium carbonate, and citric acid, or a combination of two or more thereof.

Advantageously, the toilet cleaner according to the present invention is in the form of solid granules, particularly manufactured by means of extrusion.

If desired, the toilet cleaner according to the present invention may also comprise:

- a foaming agent, such as sodium lauryl sulfate, sodium lauryl sulfoacetate, ethoxylated branched alcohols, sodium alkylbenzenesulfonate, or a combination of two or more thereof;
- a filling agent, such as sodium alkylbenzenesulfonate, such as Marlon® ARL by Sasol Performance Chemicals;
- a lubricating agent, such as polyethylene glycol, for example, PEG 400 or PEG 600;
- a tableting agent, such as polyethylene glycol, for example, PEG 9000;
- a dispersing agent, such as hydroxyethylcellulose (HEC); and/or
- a fragrance.

The cleaner according to the present invention is easy to handle, has a high cleaning power, and leads to the user to associate it with a greater cleaning power as it includes an effervescent agent.

Furthermore, it also allows a high concentration of the cleaning agent because inert ingredients are not required. It also allows using a high level of organic or inorganic salts, increasing alkalinity and softening the water.

DESCRIPTION OF A PREFERRED EMBODIMENT AND EXAMPLES

A preferred embodiment of the toilet cleaner according to the present invention is described below. All the percentages are indicated by weight.

Preferred embodiment:

Effervescent agent: Carbonate: 10-20%
Effervescent agent: Bicarbonate: 4-10%
Effervescent agent: Citric acid: 15-25%
Cleaning agent: Sulfamic acid: 5-10%
Cleaning agent: Anionic surfactant: 10-40%
Cleaning agent: Non-ionic surfactant: 15-30%
Lubricating agent: PEG 600: 5-10%
Disintegrating agent: 5-10%
Tableting agent: 10-20%
Fragrance: 1-2%

Several non-limiting examples of the toilet cleaner according to the present invention are described below. All the percentages are indicated by weight.

Example 1

Effervescent agent: Carbonate: 14.2%
Effervescent agent: Bicarbonate: 5.4%
Effervescent agent: Citric acid: 20.6%
Cleaning agent: Sulfamic acid: 8.8%
Foaming and filling agent: Marlon® ARL: 15%
Lubricating agent: PEG 600: 4%
Tableting agent: PEG 9000: 15%
Dispersing agent: Hydroxyethylcellulose: 10%
Foaming agent: Sodium lauryl sulfoacetate: 6%
Fragrance: 1%

Example 2

Effervescent agent: Carbonate: 14.2%
Effervescent agent: Bicarbonate: 5.4%
Effervescent agent: Citric acid: 20.6%
Cleaning agent: Sulfamic acid: 8.8%
Foaming and filling agent: Marlon® ARL: 15%
Lubricating agent: PEG 600: 4%

Tableting agent: PEG 9000: 15%

Disintegrating agent: Pregel: 10%

Foaming agent: Sodium laureth sulfate: 6%

Fragrance: 1%

Example 3

Effervescent agent: Carbonate: 14.2%

Effervescent agent: Bicarbonate: 5.4%

Effervescent agent: Citric acid: 20.6%

Cleaning agent: Sulfamic acid: 8.8%

Foaming and filling agent: Marlon® ARL: 15%

Lubricating agent: PEG 600: 4%

Tableting agent: PEG 9000: 15%

Dispersing agent: Hydroxyethylcellulose: 10%

Foaming agent: Sodium lauryl sulfoacetate: 6%

Fragrance 1%

Although reference has been made to a specific embodiment of the invention, it is obvious for one skilled in the art that the toilet cleaner described is susceptible to a number of variations and modifications, and that all the mentioned details can be replaced with other technically equivalent details without departing from the scope of protection defined by the attached claims.

The invention claimed is:

1. A solid toilet cleaner comprising:

a cleaning agent comprising sulfamic acid;

an effervescent agent mixture comprising a first effervescent agent, a second effervescent agent, and a third effervescent agent, the effervescent agent mixture making up a total percentage between 10% and 45% by weight;

wherein said first effervescent agent comprises sodium carbonate, said second effervescent agent comprises sodium bicarbonate, and said third effervescent agent comprises citric acid;

a lubricating agent comprising a first polyethylene glycol (PEG) having a molecular weight within a range of 400 to 600 g/mol, at a percentage between 4% and 10% by weight;

a tableting agent comprising a second PEG having a molecular weight of 9,000 g/mol, at a percentage between 10% and 20% by weight; and a dispersing agent, wherein the dispersing agent is hydroxyethylcellulose.

2. The toilet cleaner according to claim 1, also comprising a foaming agent.

3. The toilet cleaner according to claim 1, also comprising a filling agent.

4. The toilet cleaner according to claim 1, also comprising a fragrance.

5. The toilet cleaner according to claim 2, wherein the foaming agent is selected from the group including sodium lauryl sulfate, sodium lauryl sulfoacetate, ethoxylated branched alcohols, sodium alkylbenzenesulfonate, or a combination of two or more thereof.

6. The toilet cleaner according to claim 4, wherein the filling agent is sodium alkylbenzenesulfonate.

* * * * *